US012752841B2

(12) United States Patent

Woo et al.

(10) Patent No.: US 12,752,841 B2

(45) Date of Patent: Oct. 6, 2026

(54) SYSTEMS AND METHODS FOR PREDICTING ROAD WHEEL ANGLES

(71) Applicant: GM GLOBAL TECHNOLOGY OPERATIONS LLC, Detroit, MI (US)

(72) Inventors: Ami Woo, Calgary (CA); Mohammadali Shahriari, Markham (CA); Khizar Ahmad Qureshi, Pickering (CA); Hassan Askari, Thornhill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 98 days.

(21) Appl. No.: 19/008,000

(22) Filed: Jan. 2, 2025

(65) Prior Publication Data

US 2026/0184367 A1 Jul. 2, 2026

(51) Int. Cl.
*B62D 6/00* (2006.01)
*B62D 5/04* (2006.01)

(52) U.S. Cl.
CPC ............. *B62D 6/002* (2013.01); *B62D 5/049* (2013.01); *B60W 2710/207* (2013.01)

(58) Field of Classification Search
None
See application file for complete search history.

(56) References Cited

U.S. PATENT DOCUMENTS

| | | | | |
|---|---|---|---|---|
| 9,073,569 | B2 * | 7/2015 | Di Cairano | B62D 15/0235 |
| 12,214,793 | B2 * | 2/2025 | Hrvatinic | B60W 30/10 |
| 2026/0021800 | A1 * | 1/2026 | Codonesu | B60W 10/20 |

FOREIGN PATENT DOCUMENTS

| | | | | | |
|---|---|---|---|---|---|
| CN | 104057792 | A | * | 9/2014 | B60C 25/138 |
| CN | 102971200 | B | * | 6/2015 | B62D 5/0472 |
| CN | 110576898 | A | * | 12/2019 | B62D 6/00 |
| CN | 110576898 | B | * | 3/2022 | B62D 5/04 |
| CN | 109664938 | B | * | 12/2023 | B62D 5/0463 |
| CN | 118850048 | A | * | 10/2024 | B60W 30/04 |
| CN | 119611495 | A | * | 3/2025 | B62D 6/00 |

(Continued)

OTHER PUBLICATIONS

International Organization for Standardization. (2011). Road vehicles—Vehicle dynamics and road-holding ability—Vocabulary (ISO Standard No. 8855:2011). Retrieved from https://www.iso.org/standard/51180.html.

*Primary Examiner* — Kevin R Steckbauer
(74) *Attorney, Agent, or Firm* — Ingrassia Fisher & Lorenz, LLP | IFL

(57) ABSTRACT

A determination is made whether a driver torque, a road wheel angle (RWA), a yaw rate, and a heading are in a steady state, a difference in velocities of left and right rear wheels is less than a rear velocity threshold, and a difference in velocities of left and right front wheels is less than a front velocity threshold. A determination is made whether the driver torque, the RWA, the yaw rate and the heading are transient, the difference in velocities of the left and right rear wheels is greater than the rear velocity threshold, and the difference in velocities of the left and right front wheels is greater than the front velocity threshold. One of a predicted steady state RWA, a predicted transient RWA, and the measured RWA is selected based on the determinations to determine an amount of force to apply to a steering wheel of the vehicle.

20 Claims, 3 Drawing Sheets

(56) References Cited

FOREIGN PATENT DOCUMENTS

| | | | | | |
|---|---|---|---|---|---|
| CN | 121062817 | A | * | 12/2025 | ........... B62D 15/025 |
| CN | 121553108 | A | * | 2/2026 | .......... B60W 40/064 |
| CN | 121650747 | A | * | 3/2026 | |
| DE | 10059689 | A1 | * | 6/2001 | ............... B62D 6/04 |
| DE | 112020006805 | T5 | * | 2/2023 | ............... B62D 6/00 |
| EP | 0460582 | A2 | * | 12/1991 | ........... B62D 15/024 |
| JP | 2000238654 | A | * | 9/2000 | ............... B62D 6/00 |
| JP | 3525429 | B2 | * | 5/2004 | ............... B62D 6/00 |
| JP | 2006168481 | A | * | 6/2006 | |
| JP | 2006315632 | A | * | 11/2006 | |
| JP | 2007008242 | A | * | 1/2007 | |
| JP | 4687234 | B2 | * | 5/2011 | |
| JP | WO2014038133 | A1 | * | 8/2016 | ............. B62D 5/001 |
| JP | 6070711 | B2 | * | 2/2017 | ........... B62D 5/0469 |
| WO | WO-2014038133 | A1 | * | 3/2014 | ........... B62D 5/0469 |
| WO | WO-2026087029 | A1 | * | 4/2026 | ............. B62D 6/003 |

* cited by examiner

SYSTEMS AND METHODS FOR PREDICTING ROAD WHEEL ANGLES

INTRODUCTION

The technical field generally relates to vehicles, and more particularly relates to systems and methods for predicting road wheel angles.

Electric power steering (EPS) systems are often used to assist a driver of a vehicle by providing additional force to a steering wheel of the vehicle. When a driver applies driver torque to the steering wheel, a steering angle sensor (SAS) measures steering wheel angles associated with the application of the driver torque. The EPS system typically receives the measured steering wheel angles from the SAS. The amount of force applied by the EPS system to the steering wheel is based in part on the measured steering wheel angles.

Accordingly, it is desirable to provide systems and methods for predicting road wheel angles to enable an assessment of the EPS system and the SAS. Other desirable features and characteristics will become apparent from the subsequent detailed description and the appended claims, taken in conjunction with the accompanying drawings and the foregoing technical field and background.

SUMMARY

A method for predicting a road wheel angle (RWA) in a vehicle including making a first determination of whether a measured driver torque $\tau_k$ is in a steady state, a measured RWA $\delta_k$ is in a steady state, a measured yaw rate of the vehicle is in a steady state, a measured heading of the vehicle is in a steady state, a difference in velocities of a left rear wheel and a right rear wheel is less than or equal to a rear wheel velocity difference threshold, and a difference in velocities of a left front wheel and a right front wheel is less than or equal to a front wheel velocity difference threshold; making a second determination of whether the measured driver torque $\tau_k$ is transient, the measured RWA $\delta_k$ is transient, the measured yaw rate of the vehicle is transient, the measured heading of the vehicle is transient, the difference in the velocities of the left rear wheel and the right rear wheel is greater than the rear wheel velocity difference threshold, and the difference in velocities of the left front wheel and the right front wheel is greater than the front wheel velocity difference threshold; selecting one of a predicted steady state RWA $\delta_{prd.ss_{k+N}}$, a predicted transient RWA $\delta_{prd.trans_{k+N}}$, and the measured RWA based on the first and second determination to determine an amount of force to apply to a steering wheel of the vehicle; and applying the determined amount of force to the steering wheel of the vehicle.

In at least one embodiment, the method further includes: making a third determination of whether a sensor system of the vehicle has passed diagnostics tests; and selecting the one of the predicted steady state RWA $\delta_{prd.ss_{k+N}}$, the predicted transient RWA $\delta_{prd.trans_{k+N}}$, and the measured RWA based on the first, second, and third determination to determine the amount of force to apply to the steering wheel of the vehicle.

In at least one embodiment, the method further includes generating the predicted steady state RWA $\delta_{prd.ss_{k+N}}$ using a first equation, the first equation being:

$$\delta_{prd,ss_{k+N}} = \frac{\tau_k \cdot k_{\tau_{ss}}}{k_{\delta_{ss}}} - \frac{\sin\phi_k \cdot k_{\phi_{ss}}}{k_{\delta_{ss}}}$$

where: $\tau_k$ is a measured driver torque applied to the steering wheel at a current time k, $k_{\tau_{ss}}$ is a steady state driver torque gain, the steady state driver torque gain being a previously calibrated value, $\phi_k$ is a bank angle of the vehicle at the current time k, $k_{\phi_{ss}}$ is a steady state bank angle gain, and $k_{\delta_{ss}}$ is a steady state road wheel angle gain.

In at least one embodiment, the method further includes generating the predicted transient RWA $\delta_{prd.trans_{k+N}}$ using a second equation, the second equation being:

$$\delta_{prd.trans_{1+N}} = \dot{\delta}_k \Delta t + \delta_{prd.trans_{k-1}}$$

where $\dot{\delta}_k$ is an estimated road wheel angle rate, $\Delta t$ is a time difference associated with the previous predicted transient RWA $\delta_{prd.trans_{k-1}}$, and $\delta_{prd.trans_{k-1}}$ is a previous predicted transient RWA.

In at least one embodiment, the method further includes generating the estimated road wheel angle rate $\dot{\delta}_k$ using a third equation, the third equation being:

$$\dot{\delta}_k = \frac{\tau_{k-N} \cdot k_{\tau_{trans}} + \dot{\tau}_{k-N} \cdot k_{\delta_{trans}} - \left(\delta_{prd,trans_{k-1}} \cdot k_\delta + \sin\phi_k \cdot k_\phi\right)}{k_\delta}$$

where: $\tau_{k-N}$ is a previously measured driver torque, where k is a current time and N is a previous time, $k_{\tau_{trans}}$ is an adaptive transient driver torque gain, $\dot{\tau}_{k-N}$ is a derivative of the previously measured driver torque, where k is the current time and N is the previous time, $k_{\delta_{trans}}$ is a transient road wheel gain, $\delta_{prd.trans_{k-1}}$ is a previously generated transient road wheel angle prediction, $\dot{\delta}_k$ is a road wheel angle gain, $\phi_k$ is a bank angle of the vehicle, and $k_\phi$ is a bank angle gain.

In at least one embodiment, the adaptive transient drive torque gain $k_{\tau_{trans}}$ is a function of a velocity of the vehicle, an acceleration/deceleration of the vehicle, and a driver torque rate $\dot{\tau}$.

In at least one embodiment, the method further includes the measured RWA is based on a measured steering angle of the steering wheel of the vehicle received from a steering angle sensor (SAS).

A road wheel angle (RWA) prediction system includes at least one processor and at least one memory communicatively coupled to the at least one processor. The at least one memory includes instructions that upon execution by the at least one processor, cause the at least one processor to: make a first determination of whether a measured driver torque $\tau_k$ is in a steady state, a measured RWA $\delta_k$ is in a steady state, a measured yaw rate of a vehicle is in a steady state, a measured heading of the vehicle is in a steady state, a difference in velocities of a left rear wheel and a right rear wheel is less than or equal to a rear wheel velocity difference threshold, and a difference in velocities of a left front wheel and a right front wheel is less than or equal to a front wheel velocity difference threshold; make a second determination of whether the measured driver torque $\tau_k$ is transient, the measured RWA $\delta_k$ is transient, the measured yaw rate of the vehicle is transient, the measured heading of the vehicle is transient, the difference in the velocities of the left rear wheel and the right rear wheel is greater than the rear wheel velocity difference threshold, and the difference in the velocities of the left front wheel and the right front wheel is greater than the front wheel velocity difference threshold; select one of a predicted steady state RWA $\delta_{prd.ss_{k+N}}$, a predicted transient RWA $\delta_{prd.trans_{k+N}}$, and the measured RWA based on the first and second determination to determine an amount of force to apply to a steering wheel of the vehicle; and apply the determined amount of force to the steering wheel of the vehicle.

In at least one embodiment, the at least one memory further includes instructions that upon execution by the at least one processor, cause the at least one processor to: make a third determination of whether a sensor system of the vehicle has passed diagnostics tests; and select the one of the predicted steady state RWA $\delta_{prd.ss_{k+N}}$, the predicted transient RWA $\delta_{prd.trans_{k+N}}$, and the measured RWA based on the first, second, and third determination to determine the amount of force to apply to the steering wheel of the vehicle.

In at least one embodiment, the at least one memory further includes instructions that upon execution by the at least one processor, cause the at least one processor to generate the predicted steady state RWA $\delta_{prd.ss_{k+N}}$ using a first equation, the first equation being:

$$\delta_{prd.ss_{k+N}} = \frac{\tau_k \cdot k_{\tau_{ss}}}{k_{\delta_{ss}}} - \frac{\sin\phi_k \cdot k_{\phi_{ss}}}{k_{\delta_{ss}}}$$

where: $\tau_k$ is a measured driver torque applied to the steering wheel at a current time k, $k_{\tau_{ss}}$ is a steady state driver torque gain, the steady state driver torque gain being previously calibrated value, $\phi_k$ is a bank angle of the vehicle at the current time k, $k_{\phi_{ss}}$ is a steady state bank angle gain, and $k_{\delta_{ss}}$ is a steady state road wheel angle gain.

In at least one embodiment, the at least one memory further includes instructions that upon execution by the at least one processor, cause the at least one processor to generate the predicted transient RWA $\delta_{prd.trans_{k+N}}$ using a second equation, the second equation being:

$$\delta_{prd.trans_{k+N}} = \dot{\delta}_k \Delta t + \delta_{prd.trans_{k-1}}$$

where $\dot{\delta}_k$ is an estimated road wheel angle rate, $\Delta t$ is a time difference associated with the previous predicted transient RWA $\delta_{prd.trans_{k-1}}$, and $\delta_{prd.trans_{k-1}}$ is a previous predicted transient RWA.

In at least one embodiment, the at least one memory further comprises instructions that upon execution by the at least one processor, cause the at least one processor to generate the estimated road wheel angle rate $\dot{\delta}_k$ using a third equation, the third equation being:

$$\dot{\delta}_k = \frac{\tau_{k-N} \cdot k_{\tau_{trans}} + \dot{\tau}_{k-N} \cdot k_{\dot{\delta}_{trans}} - \left(\delta_{prd.trans_{k-1}} \cdot k_{\delta} + \sin\phi_k \cdot k_{\phi}\right)}{k_{\dot{\delta}}}$$

where: $\tau_{k-N}$ is a previously measured driver torque, where k is a current time and N is a previous time, $k_{\tau_{trans}}$ is an adaptive transient driver torque gain, $\dot{\tau}_{k-N}$ is a derivative of the previously measured driver torque, where k is the current time and N is the previous time, $k_{\dot{\delta}_{trans}}$ is a transient road wheel gain, $\delta_{prd.trans_{k-1}}$ is a previously generated transient road wheel angle prediction, $k_{\dot{\delta}}$ is a road wheel angle gain, $\phi_k$ is a bank angle of the vehicle, and $k_{\phi}$ is a bank angle gain.

In at least one embodiment, the adaptive transient drive torque gain $k_{\tau_{trans}}$ is a function of a velocity of the vehicle, an acceleration/deceleration of the vehicle, and a driver torque rate $\dot{\tau}$.

In at least one embodiment, the measured RWA is based on a measured steering angle of the steering wheel of the vehicle received from a steering angle sensor (SAS).

A vehicle including a road wheel angle (RWA prediction system including at least one processor and at least one memory communicatively coupled to the at least one processor. The at least one memory including instructions that upon execution by the at least one processor, cause the at least one processor to: make a first determination of whether a measured driver torque $\tau_k$ is in a steady state, a measured RWA $\delta_k$ is in a steady state, a measured yaw rate of the vehicle is in a steady state, a measured heading of the vehicle is in a steady state, a difference in velocities of a left rear wheel and a right rear wheel is less than or equal to a rear wheel velocity difference threshold, and a difference in velocities of a left front wheel and a right front wheel is less than or equal to a front wheel velocity difference threshold; make a second determination of whether the measured driver torque $\tau_k$ is transient, the measured RWA $\delta_k$ is transient, the measured yaw rate of the vehicle is transient, the measured heading of the vehicle is transient, the difference in the velocities of the left rear wheel and the right rear wheel is greater than the rear wheel velocity difference threshold, and the difference in the velocities of the left front wheel and the right front wheel is greater than the front wheel velocity difference threshold; select one of a predicted steady state RWA $\delta_{prd.ss_{k+N}}$, a predicted transient RWA $\delta_{prd.trans_{k+N}}$, and the measured RWA based on the first and second determination to determine an amount of force to apply to a steering wheel of the vehicle; and apply the determined amount of force to the steering wheel of the vehicle.

In at least one embodiment, the at least one memory further includes instructions that upon execution by the at least one processor, cause the at least one processor to: make a third determination of whether a sensor system of the vehicle has passed diagnostics tests; and select the one of the predicted steady state RWA $\delta_{prd.ss_{k+N}}$, the predicted transient RWA $\delta_{prd.trans_{k+N}}$, and the measured RWA based on the first, second, and third determination to determine the amount of force to apply to the steering wheel of the vehicle.

In at least one embodiment, the at least one memory further includes instructions that upon execution by the at least one processor, cause the at least one processor to generate the predicted steady state RWA $\delta_{prd.ss_{k+N}}$ using a first equation, the first equation being:

$$\delta_{prd.ss_{k+N}} = \frac{\tau_k \cdot k_{\tau_{ss}}}{k_{\delta_{ss}}} - \frac{\sin\phi_k \cdot k_{\phi_{ss}}}{k_{\delta_{ss}}}$$

where: $\tau_k$ is a measured driver torque applied to the steering wheel at a current time k, $k_{\tau_{ss}}$ is a steady state driver torque gain, the steady state driver torque gain being previously calibrated value, $\phi_k$ is a bank angle of the vehicle at the current time k, $k_{\phi_{ss}}$ is a steady state bank angle gain, and $k_{\delta_{ss}}$ is a steady state road wheel angle gain.

In at least one embodiment, the at least one memory further includes instructions that upon execution by the at least one processor, cause the at least one processor to generate the predicted transient RWA $\delta_{prd.trans_{k+N}}$ using a second equation, the second equation being:

$$\delta_{prd.trans_{k+N}} = \dot{\delta}_k \Delta t + \delta_{prd.trans_{k-1}}$$

where $\dot{\delta}_k$ is an estimated road wheel angle rate, $\Delta t$ is a time difference associated with the previous predicted transient RWA $\delta_{prd.trans_{k-1}}$, and $\delta_{prd.trans_{k-1}}$ is a previous predicted transient RWA.

In at least one embodiment, the at least one memory further comprises instructions that upon execution by the at least one processor, cause the at least one processor to generate the estimated road wheel angle rate $\dot{\delta}_k$ using a third equation, the third equation being:

$$\dot{\delta}_k = \frac{\tau_{k-N}\cdot k_{\tau_{trans}} + \dot{\tau}_{k-N}\cdot k_{\dot{\delta}_{trans}} - \left(\delta_{prd.trans_{k-1}}\cdot k_{\delta} + \sin\phi_k\cdot k_{\phi}\right)}{k_{\dot{\delta}}}$$

where: $\tau_{k-N}$ is a previously measured driver torque, where k is a current time and N is a previous time, $k_{\tau_{trans}}$ is an adaptive transient driver torque gain, $\dot{\tau}_{k-N}$ is a derivative of a previously measured driver torque, where k is the current time and N is the previous time, $k_{\dot{\tau}_{trans}}$ is a transient road wheel gain, $\delta_{prd.trans_{k-1}}$ is a previously generated transient road wheel angle prediction, $k_{\delta}$ is a road wheel angle gain, $\phi_k$ is a bank angle of the vehicle, and $k_{\phi}$ is a bank angle gain.

In at least one embodiment, the at least one memory further includes instructions that upon execution by the at least one processor, cause the at least one processor to: select one of the predicted steady state RWA $\delta_{prd.ss_{k+N}}$, the predicted transient RWA $\delta_{prd.trans_{k+N}}$, and the measured RWA based on the first and second determination for use during at least one of a steering angle sensor (SAS) failure and an electric power steering (EPS) silent failure.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
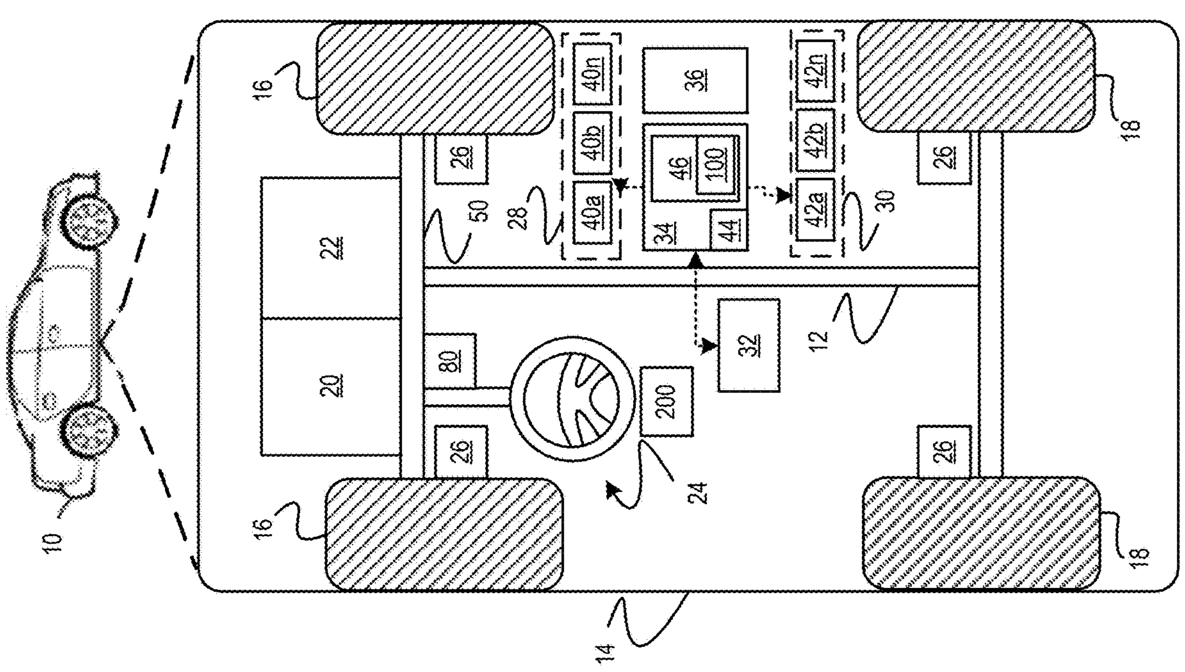
FIG. 1 is a functional block diagram of a vehicle including a road wheel angle (RWA) prediction system in accordance with at least one embodiment.

Referring to FIG. 1, a functional block diagram of a vehicle 10 including a road wheel angle (RWA) prediction system 100 in accordance with at least one embodiment is shown. The vehicle 10 generally includes a chassis 12, a body 14, front wheels 16, and rear wheels 18. The vehicle 10 is depicted in the illustrated embodiment as a passenger car, but it should be appreciated that the RWA prediction system 100 may be included within any other vehicle including trucks, sport utility vehicles (SUVs), recreational vehicles (RVs), etc., can also be used.

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an advanced driver assistance system (ADAS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices **40*a*-40*n* that sense observable conditions of the exterior environment and/or the interior environment of the vehicle 10. The sensing devices 40*a*-40*n*** can include, but are not limited to, radars, lidars, global positioning systems, optical cameras, thermal cameras, ultrasonic sensors, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices **42*a*-42*n* that control one or more vehicle features such as, but not limited to, the propulsion system 20, the transmission system 22, the steering system 24, and the braking system 26**. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles (vehicle to vehicle "V2V" communication,) infrastructure (vehicle to infrastructure "V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADAS of the vehicle 10. In various embodiments, the data storage device 32 stores defined maps of the navigable environment. In various embodiments, the defined maps may be predefined by and obtained from a remote system.

For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms.

Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADAS.

Figure 2:
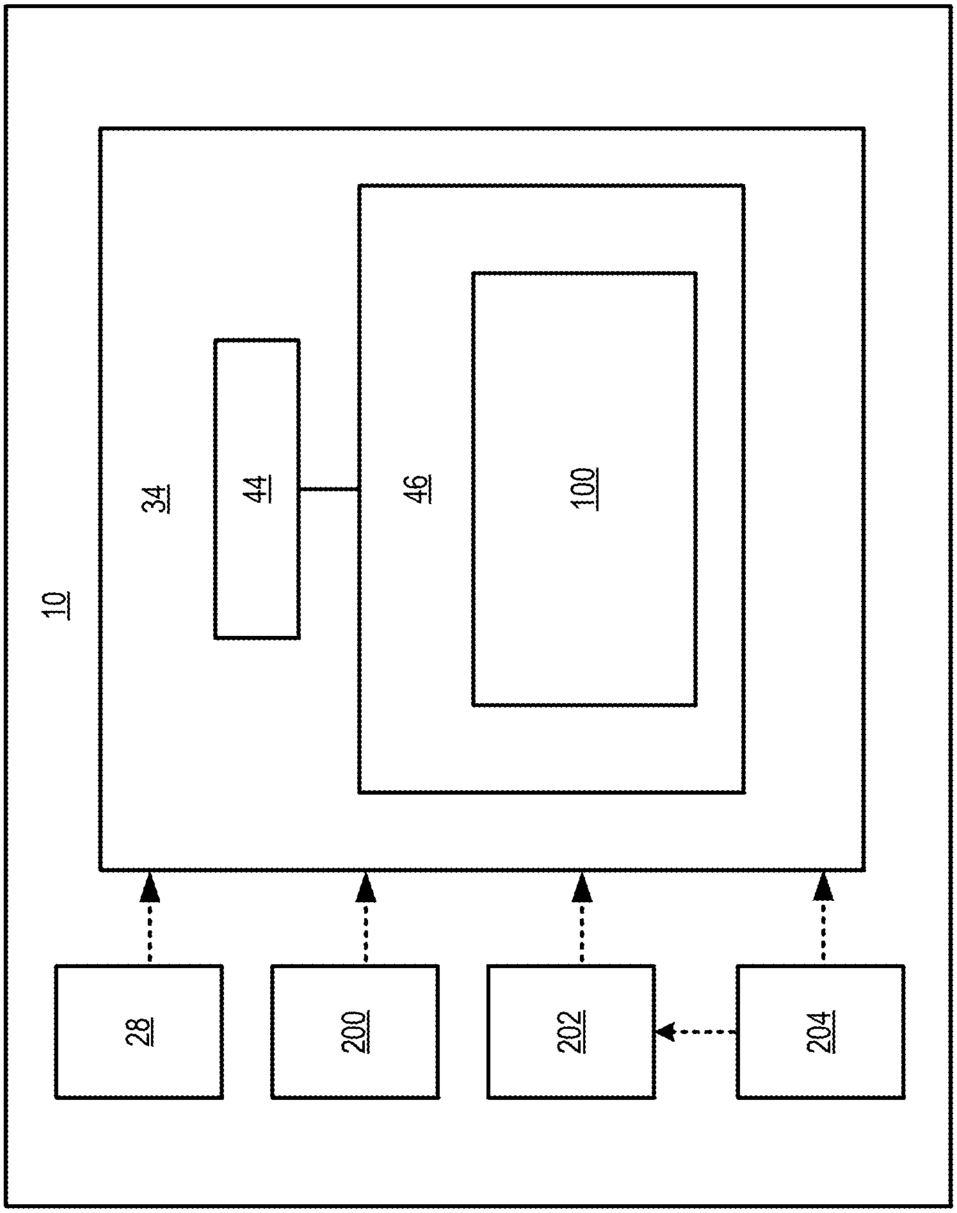
FIG. 2 is a functional block diagram of a controller including a RWA prediction system in accordance with at least one embodiment.

Referring to FIG. 2, a functional block diagram of a controller 34 including a RWA prediction system 100 in accordance with at least one embodiment is shown. The controller 34 includes at least one processor 44 and at least one memory 46. The at least one processor 44 is a programmable device that includes one or more instructions stored in or associated with the at least one memory 46. The at least one memory 46 includes instructions that the at least one processor 44 is configured to execute. The at least one memory 46 includes an embodiment of the RWA prediction system 100.

The controller 34 is configured to be communicatively coupled to a sensor system 28, wheel speed sensors 200, electric power steering (EPS) system 202, and steering angle sensor (SAS) 204. The EPS system 202 is configured to be communicatively coupled to the SAS 204. The controller 34 may include additional components that facilitate operation of the RWA prediction system 100.

Figure 3:
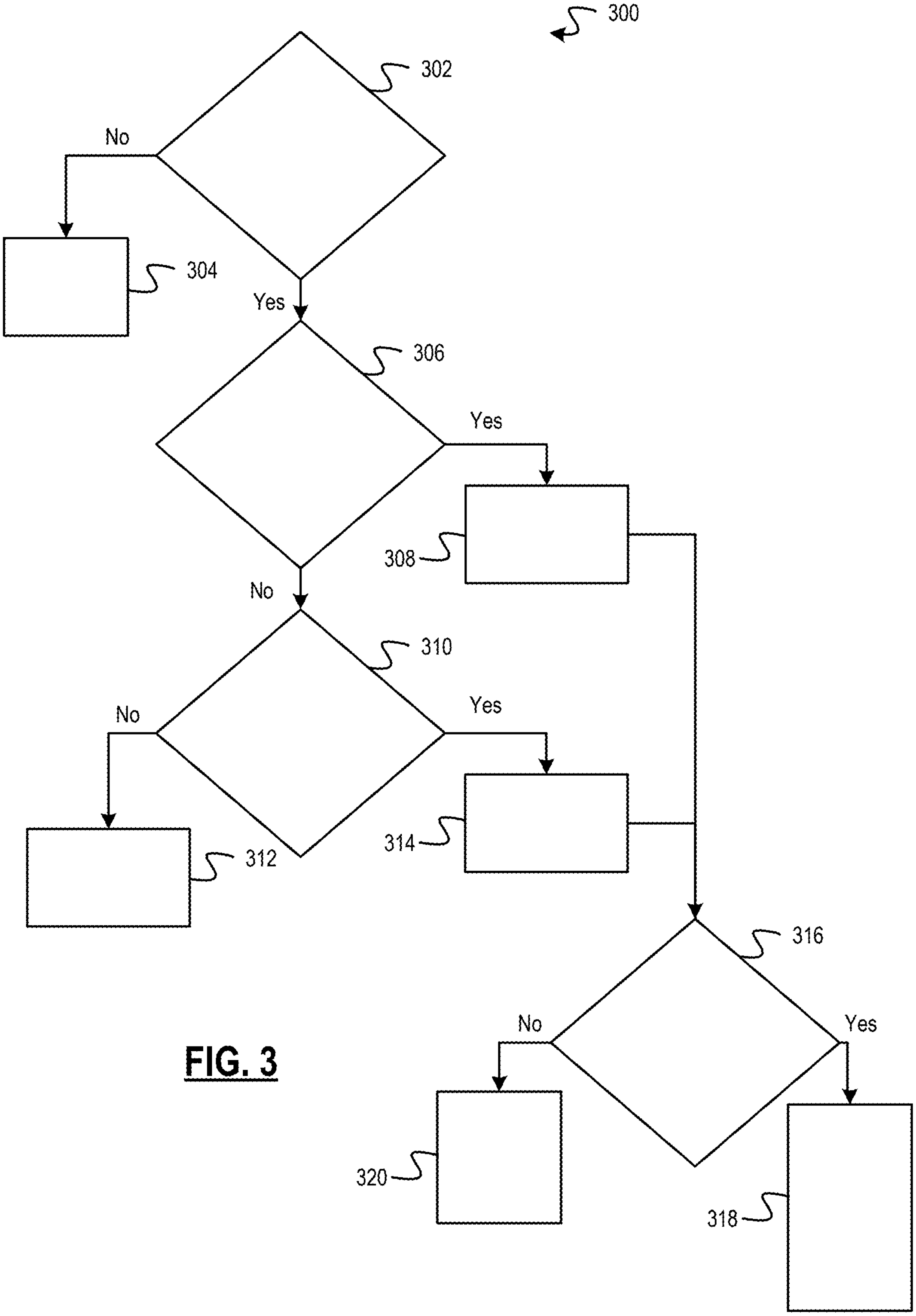
FIG. 3 is a flowchart representation of an exemplary method of performing an assessment of the SAS system using an RWA prediction system in accordance with at least one embodiment.

Referring to FIG. 3, a flowchart representation of an exemplary method 300 of performing an assessment of the SAS system using a RWA prediction system in accordance with at least one embodiment is shown. The method 300 will be described with reference to an exemplary implementation of the RWA prediction system 100. As can be appreciated in light of the disclosure, the order of operation within the method 300 is not limited to the sequential execution as illustrated in FIG. 3 but may be performed in one or more varying orders as applicable and in accordance with the present disclosure.

At 302, the road wheel angle (RWA) prediction system 100 determines whether sensors of a vehicle 10 passed diagnostics tests. The sensors include, but are not limited to, a sensor system 28 and wheel speed sensors 200. The RWA prediction system receives diagnostics test results associated with the sensors. The RWA prediction system 100 determines whether the sensors passed the diagnostics tests based on the received diagnostics test results. The sensor system 28 includes an inertial measurement unit (IMU) and a yaw rate sensor. The IMU is configured to provide a bank angle $\phi_k$ of the vehicle 10. The yaw rate sensor is configured to provide a yaw rate of the vehicle 10. The wheel speed sensors 200 are configured to provide wheel speeds of each of the wheels of the vehicle 10.

If the RWA prediction system 100 determines that the sensors did not pass the diagnostics tests, the RWA prediction system 100 is configured to generate a sensor failed diagnostic notification for display on a display device of the vehicle 10 at 304.

If the RWA prediction system 100 determines that the sensors did pass the diagnostics tests, the RWA prediction system 100 is configured to determine whether to generate a predicted steady state RWA $\delta_{prd.ss_{k+N}}$, where k represents a current time and k+N represents a future time at 306.

The RWA prediction system 100 is configured to determine to generate the predicted steady state RWA $\delta_{prd.ss_{k+N}}$ when the RWA prediction system 100 determines that the following conditions have been fulfilled: a measured driver torque $\tau_k$ is in a steady state, a measured RWA $\delta_k$ is in a steady state, a measured yaw rate of the vehicle 10 is in a steady state, a measured heading of the vehicle 10 is in a steady state, a difference in velocities of a left rear wheel and a right rear wheel is less than or equal to a rear wheel velocity difference threshold, and a difference in velocities of a left front wheel and a right front wheel is less than or equal to a front wheel velocity difference threshold.

The measured driver torque $\tau_k$ is considered to be steady state if a change in the measured driver torque $\tau_k$ over a period of time is less than a driver torque difference threshold. The measured RWA $\delta_k$ is considered to be steady state if a change in the measured RWA $\delta_k$ is over a period of time is less than a RWA difference threshold. The measured yaw rate is considered to be steady state if a change in the measured yaw rate over a period of time is less than a yaw rate difference threshold. The measured heading is considered to be steady state if a change in the measured heading over a period of time is less than a heading difference threshold.

If the RWA prediction system 100 determines to generate the predicted steady state RWA $\delta_{prd.ss_{k+N}}$ based on a fulfillment of the conditions, the RWA prediction system 100 generates the predicted steady state RWA $\delta_{prd.ss_{k+N}}$ at 308 and the method 300 proceeds to 316. The generation of the predicted steady state RWA $\delta_{prd.ss_{k+N}}$ will be described in greater detail below.

If the RWA prediction system 100 determines to not generate the predicted steady state RWA $\delta_{prd.ss_{k+N}}$ as a result of one or more of the conditions being unfulfilled, the RWA prediction system 100 is configured to determine whether to generate a predicted transient RWA $\delta_{prd.trans_{k+N}}$, where k represents a current time and k+N represents a future time at 310.

The RWA prediction system 100 is configured to determine to generate the predicted transient RWA $\delta_{prd.trans_{k+N}}$ when the RWA prediction system 100 determines that the following conditions have been fulfilled: a measured driver torque $\tau_k$ is transient, a measured RWA $\delta_k$ is transient, a measured yaw rate of the vehicle 10 is transient, a measured heading of the vehicle 10 is transient, a difference in velocities of a left rear wheel and a right rear wheel is greater than the rear wheel velocity difference threshold, and a difference in velocities of a left front wheel and a right front wheel is greater than the front wheel velocity difference threshold.

The measured driver torque $\tau_k$ is considered to be transient if a change in the measured driver torque $\tau_k$ over a period of time is greater than the driver torque difference threshold. The measured RWA $\delta_k$ is considered to be transient if a change in the measured RWA $\delta_k$ is over a period of time is greater than a RWA difference threshold. The measured yaw rate is considered to be transient if a change in the measured yaw rate over a period of time is greater than a yaw rate difference threshold. The measured heading is considered to be transient if a change in the measured heading over a period of time is greater than a heading difference threshold.

If the RWA prediction system 100 determines to not generate the predicted transient RWA $\delta_{prd.trans_{k+N}}$ as a result of one or more of the conditions being unfulfilled, the RWA prediction system 100 is configured to use the measured RWA associated with the measured SAS at 312. The RWA prediction system 100 determines an amount of force to apply to a steering wheel of the vehicle 10 using the measured RWA associated with the measured SAS and applies the determined amount of force to the steering wheel of the vehicle 10.

If the RWA prediction system 100 determines to generate the predicted transient RWA $\delta_{prd.trans_{k+N}}$ based on a fulfillment of the conditions, the RWA prediction system 100 generates the predicted transient RWA $\delta_{prd.trans_{k+N}}$ at 314 and the method proceeds to 316. The generation of the transient RWA $\delta_{prd.trans_{k+N}}$ will be described in greater detail below.

At 316, the RWA prediction system 100 determines whether a difference between the predicted RWA and the measured RWA is less than a RWA threshold. If the predicted RWA is the predicted steady state RWA $\delta_{prd.ss_{k+N}}$ the RWA prediction system 100 determines whether a difference between the predicted steady state RWA $\delta_{prd.ss_{k+N}}$ and the measured RWA is less than a RWA threshold. If the predicted RWA is the predicted transient RWA $\delta_{prd.trans_{k+N}}$ the RWA prediction system 100 determines whether a difference between the predicted transient RWA $\delta_{prd.trans_{k+N}}$ and the measured RWA is less than the RWA threshold.

If the RWA prediction system 100 determines that the difference between the predicted RWA and the measured RWA is less than a RWA threshold, the RWA prediction system 100 instructs the EPS system 202 to use the measure RWA to determine the amount of additional force to add to the steering wheel to assist the driver at 318. The measured RWA is based on the measured steering angle. The RWA prediction system 100 determines an amount of force to apply to a steering wheel of the vehicle 10 using the measured RWA and applies the determined amount of force to the steering wheel of the vehicle 10.

If the RWA prediction system 100 determines that the difference between the predicted RWA and the measured RWA is greater than the RWA threshold, the RWA prediction system 100 instructs the EPS system 202 to use the predicted RWA at 320 to determine the amount of additional force to add to the steering wheel to assist the driver at 318. If the predicted RWA is the predicted steady state RWA $\delta_{prd.ss_{k+N}}$ the RWA prediction system 100 the RWA prediction system 100 instructs the EPS system 202 to use the predicted steady state RWA $\delta_{prd.ss_{k+N}}$ to determine the amount of additional force to add to the steering wheel to assist the driver. The RWA prediction system 100 applies the determined amount of force to the steering wheel of the vehicle 10.

If the predicted RWA is the predicted transient RWA $\delta_{prd.trans_{k+N}}$ the RWA prediction system 100 the RWA prediction system 100 instructs the EPS system 202 to use the predicted transient RWA $\delta_{prd.trans_{k+N}}$ to determine the amount of additional force to add to the steering wheel to assist the driver. The RWA prediction system 100 applies the determined amount of force to the steering wheel of the vehicle.

The RWA prediction system 100 is configured to generate the predicted steady state RWA $\delta_{prd.ss_{k+N}}$ at 308 of method 300. The EPS system 202 includes a torque sensor. The torque sensor is configured to sense a measured driver torque $\tau_k$ applied to a steering wheel by a driver at a current time k. The RWA prediction system 100 is configured to receive the measured driver torque $\tau_k$ applied to the steering wheel. The RWA prediction system 100 is configured to multiply the measured driver torque $\tau_k$ by a steady state driver torque gain $k_{\tau_{ss}}$ divided by a steady state road wheel angle gain $k_{\delta_{ss}}$ to generate a first value $$\left(\frac{\tau_k \cdot k_{\tau_{ss}}}{k_{\delta_{ss}}}\right).$$

The steady state driver torque gain $k_{\tau_{ss}}$ and the steady state road wheel angle gain $k_{\delta_{ss}}$ are previously calibrated values stored at the RWA prediction system 100.

The RWA prediction system 100 is configured to receive a bank angle $\phi_k$ of the vehicle 10 from a sensor system 28. The sensor system 28 includes an inertial measurement unit (IMU). The IMU senses the bank angle $\phi_k$ of the vehicle 10. The RWA prediction system 100 is configured to calculate a sine of the bank angle sin $\phi_k$. The RWA prediction system 100 is configured to multiply the sine of the bank angle sin $\phi_k$ by a steady state bank angle gain $k_{\phi_{ss}}$ divided by a steady state road wheel angle gain $k_{\delta_{ss}}$ to generate a second value $$\left(\frac{\sin\phi_k \cdot k_{\phi_{ss}}}{k_{\delta_{ss}}}\right).$$

The steady state bank angle gain $k_{\phi_{ss}}$ and the steady state road wheel angle gain $k_{\delta_{ss}}$ are previously calibrated values stored at the RWA prediction system 100.

The RWA prediction system 100 is configured to generate the predicted steady state RWA $\delta_{prd.ss_{k+N}}$ by subtracting the second value $$\left(\frac{\sin\phi_k \cdot k_{\phi_{ss}}}{k_{\delta_{ss}}}\right)$$

from the first value a first value $$\left(\frac{\tau_k \cdot k_{\tau_{ss}}}{k_{\delta_{ss}}}\right).$$

The generation of the predicted steady state RWA $\delta_{prd.ss_{k+N}}$ using the steps detailed above is represented by the equation below:

$$\delta_{prd.ss_{k+N}} = \frac{\tau_k \cdot k_{\tau_{ss}}}{k_{\delta_{ss}}} - \frac{\sin\phi_k \cdot k_{\phi_{ss}}}{k_{\delta_{ss}}}$$

The RWA prediction system 100 is configured to generate the predicted transient RWA $\delta_{prd.trans_{k+N}}$ at 314 of method 300. The RWA prediction system 100 previously received a previously measured driver torque $\tau_{k-N}$ from the EPS system 202 where k is a current time and N is a previous time. The RWA prediction system 100 is configured to multiply the previously measured driver torque $\tau_{k-N}$ by an adaptive transient driver torque gain $k_{\tau_{trans}}$ to generate a first value $(\tau_{k-N} \cdot k_{\tau_{trans}})$. The adaptive transient drive torque gain $k_{\tau_{trans}}$ is a function of a velocity of the vehicle 10, an acceleration/deceleration of the vehicle 10, and a driver torque rate $\dot{\tau}$.

The RWA prediction system 100 is configured to multiply a derivative of the previously received driver torque $\dot{\tau}_{k-N}$ by a transient road wheel gain $k_{\delta_{trans}}$ to generate a second value $(\dot{\tau}_{k-N} \cdot k_{\delta_{trans}})$. The transient road wheel gain $k_{\delta_{trans}}$ is a previously calibrated value stored at the RWA prediction system 100.

The RWA prediction system 100 is configured to multiply a previously generated transient road wheel angle prediction $\delta_{prd.trans_{k-1}}$ by a transient road wheel angle gain $k_\delta$ to generate a third value $(\delta_{prd.trans_{k-1}} \cdot k_\delta)$. The transient drive torque gain $k_{\tau_{trans}}$ is the previously calibrated value stored at the RWA prediction system 100.

The RWA prediction system 100 is configured to receive a bank angle $\phi_k$ from the IMU of the sensor system 28, calculate a sine of the bank angle sin $\phi_k$, and multiply the sine of the bank angle sin $\phi_k$ by a transient angle gain $k_{\phi_{trans}}$ to generate a fourth value $(\sin\phi_k \cdot k_\phi)$.

The RWA prediction system 100 is configured to add the third value $(\delta_{prd.trans_{k-1}} \cdot k_\delta)$ to the fourth value $(\sin\phi_k \cdot k_\phi)$ to generate a fifth value $(\delta_{prd.trans_{k-1}} \cdot k_\delta + \sin\phi_k \cdot k_\phi)$.

The RWA prediction system 100 is configured to add the first value $(\tau_{k-N} \cdot k_{\tau_{trans}})$ to the second value $(\dot{\tau}_{k-N} \cdot k_{\delta_{trans}})$ and subtract the fifth value $(\delta_{prd,trans_{k-1}} \cdot k_\delta + \sin\phi_k \cdot k_\phi)$ to generate a sixth value $[\tau_{k-N} \cdot k_{\tau_{trans}} + \dot{\tau}_{k-N} \cdot k_{\delta_{trans}} - (\delta_{prd,trans_{k-1}} \cdot k_\delta + \sin\phi_k \cdot k_\phi)]$.

The RWA prediction system 100 is configured to divide the sixth value $[\tau_{k-N} \cdot k_{\tau_{trans}} + \dot{\tau}_{k-N} \cdot k_{\delta_{trans}} - (\delta_{prd.trans_{k-1}} \cdot k_\delta + \sin\phi_k \cdot k_\phi)]$ by a transient road wheel angle gain $k_{\delta_{trans}}$ to generate an estimated road wheel angle rate $\dot{\delta}_k$.

The generation of estimated road wheel angle rate $\dot{\delta}_k$ using the steps detailed above is represented by the equation below:

$$\dot{\delta}_k = \frac{\tau_{k-N} \cdot k_{\tau_{trans}} + \dot{\tau}_{k-N} \cdot k_{\delta_{trans}} - \left(\delta_{prd.trans_{k-1}} \cdot k_{\delta} + \sin\phi_k \cdot k_{\phi}\right)}{k_{\dot{\delta}}}$$

The RWA prediction system 100 is configured to calculate the predicted transient RWA $\delta_{prd.trans_{k+N}}$ using the equation below:

$$\delta_{prd.trans_{k+N}} = \dot{\delta}_k \Delta t + \delta_{prd.trans_{k-1}}$$

where $\dot{\delta}_k$ is the estimated road wheel angle rate, $\Delta t$ is a time difference between the previous predicted transient RWA $\delta_{prd.trans_{k-1}}$ and the updated predicted transient RWA $\delta_{prd.trans_{k+N}}$, and $\delta_{prd.trans_{k-1}}$ is the previous predicted transient RWA.

In at least one embodiment, the RWA prediction system 100 is configured to select one of the predicted steady state RWA $\delta_{prd.ss_{k+N}}$, the predicted transient RWA $\delta_{prd.trans_{k+N}}$, and the measured RWA based on the first and second determination for use during at least one of a steering angle sensor (SAS) failure and an electric power steering (EPS) silent failure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for predicting a road wheel angle (RWA) in a vehicle comprising:

making a first determination of whether a measured driver torque $\tau_k$ is in a steady state, a measured RWA $\delta_k$ is in a steady state, a measured yaw rate of the vehicle is in a steady state, a measured heading of the vehicle is in a steady state, a difference in velocities of a left rear wheel and a right rear wheel is less than or equal to a rear wheel velocity difference threshold, and a difference in velocities of a left front wheel and a right front wheel is less than or equal to a front wheel velocity difference threshold;

making a second determination of whether the measured driver torque $\tau_k$ is transient, the measured RWA $\delta_k$ is transient, the measured yaw rate of the vehicle is transient, the measured heading of the vehicle is transient, the difference in the velocities of the left rear wheel and the right rear wheel is greater than the rear wheel velocity difference threshold, and the difference in velocities of the left front wheel and the right front wheel is greater than the front wheel velocity difference threshold;

selecting one of a predicted steady state RWA $\delta_{prd.ss_{k+N}}$, a predicted transient RWA $\delta_{prd.trans_{k+N}}$, and the measured RWA based on the first and second determination to determine an amount of force to apply to a steering wheel of the vehicle; and applying the determined amount of force to the steering wheel of the vehicle.

2. The method of claim 1 further comprising:

making a third determination of whether a sensor system of the vehicle has passed diagnostics tests; and selecting the one of the predicted steady state RWA $\delta_{prd.ss_{k+N}}$, the predicted transient RWA $\delta p_{rd.trans_{k+N}}$, and the measured RWA based on the first, second, and third determination to determine the amount of force to apply to the steering wheel of the vehicle.

3. The method of claim 1, further comprising:

generating the predicted steady state RWA $\delta_{prd.ss_{k+N}}$ using a first equation, the first equation being:

$$\delta_{prd.ss_{k+N}} = \frac{\tau_k \cdot k_{\tau_{ss}}}{k_{\delta_{ss}}} - \frac{\sin\phi_k \cdot k_{\phi_{ss}}}{k_{\delta_{ss}}}$$

where:

$\tau_k$ is a measured driver torque applied to the steering wheel at a current time k, $k_{\tau_{ss}}$ is a steady state driver torque gain, the steady state driver torque gain being a previously calibrated value, $\phi_k$ is a bank angle of the vehicle at the current time k, $k_{\phi_{ss}}$ is a steady state bank angle gain, and $k_{\delta_{ss}}$ is a steady state road wheel angle gain.

4. The method of claim 1, further comprising:

generating the predicted transient RWA $\delta_{prd.trans_{k+N}}$ using a second equation, the second equation being:

$$\delta_{prd.trans_{k+N}} = \dot{\delta}_k \Delta t + \delta_{prd.trans_{k-1}}$$

where $\dot{\delta}_k$ is an estimated road wheel angle rate, $\Delta t$ is a time difference associated with the previous predicted transient RWA $\delta_{prd.trans_{k-1}}$, and $\delta_{prd.trans_{k-1}}$ is a previous predicted transient RWA.

5. The method of claim 4, further comprising:

generating the estimated road wheel angle rate $\dot{\delta}_k$ using a third equation, the third equation being:

$$\dot{\delta}_k = \frac{\tau_{k-N} \cdot k_{\tau_{trans}} + \dot{\tau}_{k-N} \cdot k_{\delta_{trans}} - \left(\delta_{prd.trans_{k-1}} \cdot k_{\delta} + \sin\phi_k \cdot k_{\phi}\right)}{k_{\dot{\delta}}}$$

where:

$\tau_{k-N}$ is a previously measured driver torque, where k is a current time and N is a previous time, $k_{\tau_{trans}}$ is an adaptive transient driver torque gain, $\dot{\tau}_{k-N}$ is a derivative of the previously measured driver torque, where k is the current time and N is the previous time, $k_{\delta_{trans}}$ is a transient road wheel gain, $\delta_{prd.trans_{k-1}}$ is a previously generated transient road wheel angle prediction, $k_{\dot{\delta}}$ is a road wheel angle gain, $\phi_k$ is a bank angle of the vehicle, and $k_{\phi}$ is a bank angle gain.

6. The method of claim 5, wherein the adaptive transient drive torque gain $k_{\tau_{trans}}$ is a function of a velocity of the vehicle, an acceleration/deceleration of the vehicle, and a driver torque rate $\dot{\tau}$.

7. The method of claim 1, wherein the measured RWA is based on a measured steering angle of the steering wheel of the vehicle received from a steering angle sensor (SAS).

8. A road wheel angle (RWA) prediction system comprising:
- at least one processor; and
- at least one memory communicatively coupled to the at least one processor, the at least one memory comprising instructions that upon execution by the at least one processor, cause the at least one processor to:
- make a first determination of whether a measured driver torque $\tau_k$ is in a steady state, a measured RWA $\delta_k$ is in a steady state, a measured yaw rate of a vehicle is in a steady state, a measured heading of the vehicle is in a steady state, a difference in velocities of a left rear wheel and a right rear wheel is less than or equal to a rear wheel velocity difference threshold, and a difference in velocities of a left front wheel and a right front wheel is less than or equal to a front wheel velocity difference threshold;
- make a second determination of whether the measured driver torque $\tau_k$ is transient, the measured RWA $\delta_k$ is transient, the measured yaw rate of the vehicle is transient, the measured heading of the vehicle is transient, the difference in the velocities of the left rear wheel and the right rear wheel is greater than the rear wheel velocity difference threshold, and the difference in the velocities of the left front wheel and the right front wheel is greater than the front wheel velocity difference threshold;
- select one of a predicted steady state RWA $\delta_{prd.ss_{k+N}}$, a predicted transient RWA $\delta_{prd.trans_{k+N}}$, and the measured RWA based on the first and second determination to determine an amount of force to apply to a steering wheel of the vehicle; and
- apply the determined amount of force to the steering wheel of the vehicle.

9. The system of claim 8, wherein the at least one memory further comprises instructions that upon execution by the at least one processor, cause the at least one processor to:
- make a third determination of whether a sensor system of the vehicle has passed diagnostics tests; and
- select the one of the predicted steady state RWA $\delta_{prd.ss_{k+N}}$, the predicted transient RWA $\delta_{prd.trans_{k+N}}$, and the measured RWA based on the first, second, and third determination to determine the amount of force to apply to the steering wheel of the vehicle.

10. The system of claim 8, wherein the at least one memory further comprises instructions that upon execution by the at least one processor, cause the at least one processor to:
- generate the predicted steady state RWA $\delta_{prd.ss_{k+N}}$ using a first equation, the first equation being:

$$\delta_{prd.ss_{k+N}} = \frac{\tau_k \cdot k_{\tau_{ss}}}{k_{\delta_{ss}}} - \frac{\sin\phi_k \cdot k_{\phi_{ss}}}{k_{\delta_{ss}}}$$

where:
- $\tau_k$ is a measured driver torque applied to the steering wheel at a current time k,
- $k_{\tau_{ss}}$ is a steady state driver torque gain, the steady state driver torque gain being previously calibrated value,
- $\phi_k$ is a bank angle of the vehicle at the current time k,
- $k_{\phi_{ss}}$ is a steady state bank angle gain, and
- $k_{\delta_{ss}}$ is a steady state road wheel angle gain.

11. The system of claim 8, wherein the at least one memory further comprises instructions that upon execution by the at least one processor, cause the at least one processor to:
- generate the predicted transient RWA $\delta_{prd.trans_{k+N}}$ using a second equation, the second equation being:

$$\delta_{prd.trans_{k+N}} = \dot{\delta}_k \Delta t + \delta_{prd.trans_{k-1}}$$

where $\dot{\delta}_k$ is an estimated road wheel angle rate,
- $\Delta t$ is a time difference associated with the previous predicted transient RWA $\delta_{prd.trans_{k-1}}$, and $\delta_{prd.trans_{k-1}}$ is a previous predicted transient RWA.

12. The system of claim 11, wherein the at least one memory further comprises instructions that upon execution by the at least one processor, cause the at least one processor to:
- generate the estimated road wheel angle rate $\dot{\delta}_k$ using a third equation, the third equation being:

$$\dot{\delta}_k = \frac{\tau_{k-N} \cdot k_{\tau_{trans}} + \dot{\tau}_{k-N} \cdot k_{\dot{\delta}_{trans}} - \left(\delta_{prd.trans_{k-1}} \cdot k_{\delta} + \sin\phi_k \cdot k_{\phi}\right)}{k_{\dot{\delta}}}$$

where:
- $\tau_{k-N}$ is a previously measured driver torque, where k is a current time and N is a previous time,
- $k_{\tau_{trans}}$ is an adaptive transient driver torque gain,
- $\dot{\tau}_{k-N}$ is a derivative of the previously measured driver torque, where k is the current time and N is the previous time,
- $k_{\dot{\delta}_{trans}}$ is a transient road wheel gain,
- $\delta_{prd.trans_{k-1}}$ is a previously generated transient road wheel angle prediction,
- $k_{\dot{\delta}}$ is a road wheel angle gain,
- $\phi_k$ is a bank angle of the vehicle, and
- $k_{\phi}$ is a bank angle gain.

13. The system of claim 11, wherein the adaptive transient drive torque gain $k_{\tau_{trans}}$ is a function of a velocity of the vehicle, an acceleration/deceleration of the vehicle, and a driver torque rate $\dot{\tau}$.

14. The system of claim 1, wherein the measured RWA is based on a measured steering angle of the steering wheel of the vehicle received from a steering angle sensor (SAS).

15. A vehicle including a road wheel angle (RWA prediction system comprising:
- at least one processor; and
- at least one memory communicatively coupled to the at least one processor, the at least one memory comprising instructions that upon execution by the at least one processor, cause the at least one processor to:
- make a first determination of whether a measured driver torque $\tau_k$ is in a steady state, a measured RWA $\delta_k$ is in a steady state, a measured yaw rate of the vehicle is in a steady state, a measured heading of the vehicle is in a steady state, a difference in velocities of a left rear wheel and a right rear wheel is less than or equal to a rear wheel velocity difference threshold, and a difference in velocities of a left front wheel and a right front wheel is less than or equal to a front wheel velocity difference threshold;

make a second determination of whether the measured driver torque $\tau_k$ is transient, the measured RWA $\delta_k$ is transient, the measured yaw rate of the vehicle is transient, the measured heading of the vehicle is transient, the difference in the velocities of the left rear wheel and the right rear wheel is greater than the rear wheel velocity difference threshold, and the difference in the velocities of the left front wheel and the right front wheel is greater than the front wheel velocity difference threshold;

select one of a predicted steady state RWA $\delta_{prd.ss_{k+N}}$, a predicted transient RWA $\delta_{prd.trans_{k+N}}$, and the measured RWA based on the first and second determination to determine an amount of force to apply to a steering wheel of the vehicle; and apply the determined amount of force to the steering wheel of the vehicle.

16. The vehicle of claim 15, wherein the at least one memory further comprises instructions that upon execution by the at least one processor, cause the at least one processor to:

make a third determination of whether a sensor system of the vehicle has passed diagnostics tests; and select the one of the predicted steady state RWA $\delta_{prd.ss_{k+N}}$, the predicted transient RWA $\delta_{prd.trans_{k+N}}$, and the measured RWA based on the first, second, and third determination to determine the amount of force to apply to the steering wheel of the vehicle.

17. The vehicle of claim 15, wherein the at least one memory further comprises instructions that upon execution by the at least one processor, cause the at least one processor to:

generate the predicted steady state RWA $\delta_{prd.ss_{k+N}}$ using a first equation, the first equation being:

$$\delta_{prd.ss_{k+N}} = \frac{\tau_k \cdot k_{\tau_{ss}}}{k_{\delta_{ss}}} - \frac{\sin\phi_k \cdot k_{\phi_{ss}}}{k_{\delta_{ss}}}$$

where:

$\tau_k$ is a measured driver torque applied to the steering wheel at a current time k, $k_{\tau_{ss}}$ is a steady state driver torque gain, the steady state driver torque gain being previously calibrated value, $\phi_k$ is a bank angle of the vehicle at the current time k, $k_{\phi_{ss}}$ is a steady state bank angle gain, and $k_{\delta_{ss}}$ is a steady state road wheel angle gain.

18. The vehicle of claim 17, wherein the at least one memory further comprises instructions that upon execution by the at least one processor, cause the at least one processor to:

generate the predicted transient RWA $\delta_{prd.trans_{k+N}}$ using a second equation, the second equation being:

$$\delta_{prd.trans_{k+N}} = \dot{\delta}_k \Delta t + \delta_{prd.trans_{k-1}}$$

where $\dot{\delta}_k$ is an estimated road wheel angle rate, $\Delta t$ is a time difference associated with the previous predicted transient RWA $\delta_{prd.trans_{k-1}}$, and $\delta_{prd.trans_{k-1}}$ is a previous predicted transient RWA.

19. The vehicle of claim 18, wherein the at least one memory further comprises instructions that upon execution by the at least one processor, cause the at least one processor to:

generate the estimated road wheel angle rate $\dot{\delta}_k$ using a third equation, the third equation being:

$$\dot{\delta}_k = \frac{\tau_{k-N} \cdot k_{\tau_{trans}} + \dot{\tau}_{k-N} \cdot k_{\dot{\delta}_{trans}} - (\delta_{prd.trans_{k-1}} \cdot k_{\delta} + \sin\phi_k \cdot k_{\phi})}{k_{\dot{\delta}}}$$

where:

$\tau_{k-N}$ is a previously measured driver torque, where k is a current time and N is a previous time, $k_{\tau_{trans}}$ is an adaptive transient driver torque gain, $\dot{\tau}_{k-N}$ is a derivative of a previously measured driver torque, where k is the current time and N is the previous time, $k_{\dot{\delta}_{trans}}$ is a transient road wheel gain, $\delta_{prd.trans_{k-1}}$ is a previously generated transient road wheel angle prediction, $k_{\dot{\delta}}$ is a road wheel angle gain, $\phi_k$ is a bank angle of the vehicle, and $k_{\phi}$ is a bank angle gain.

20. The vehicle of claim 19, wherein the at least one memory further comprises instructions that upon execution by the at least one processor, cause the at least one processor to:

select one of the predicted steady state RWA $\delta_{prd.ss_{k+N}}$, the predicted transient RWA $\delta_{prd.trans_{k+N}}$, and the measured RWA based on the first and second determination for use during at least one of a steering angle sensor (SAS) failure and an electric power steering (EPS) silent failure.

* * * * *